Dec. 16, 1930.   B. C. MELTON   1,784,970
ATTACHMENT FOR HOLDING PICTURES AGAINST POCKET MIRRORS
Filed March 4, 1927
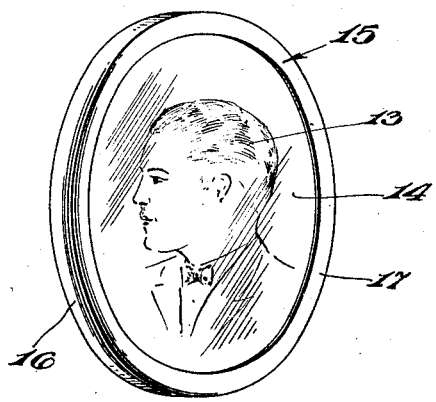
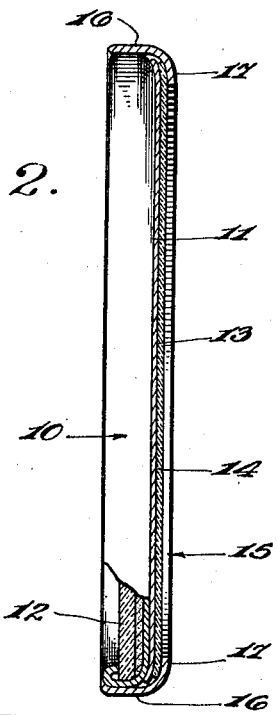
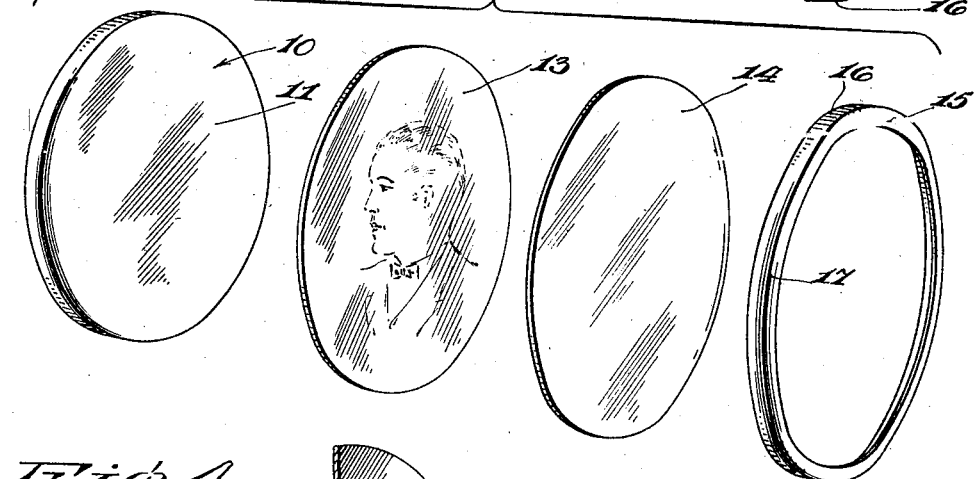
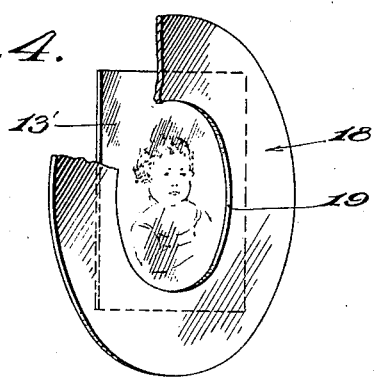
Bert C. Melton
INVENTOR
BY Victor J. Evans
ATTORNEY
WITNESS:

Patented Dec. 16, 1930

1,784,970

UNITED STATES PATENT OFFICE

BERT CLARKE MELTON, OF LONDON, ENGLAND

ATTACHMENT FOR HOLDING PICTURES AGAINST POCKET MIRRORS

Application filed March 4, 1927. Serial No. 172,895.

This invention relates to improvements in pocket mirrors and has particular reference to a novel means of mounting a picture or photograph on the back face of a pocket mirror.

The primary object of the invention resides in the provision of a simple means of interchangeably mounting one's favorite photograph upon the back of a pocket mirror, whereby the photograph may be removed when desired and another substituted therefor. It will be appreciated that the backs of pocket mirrors are now provided with pictures or advertising indicia but the same is printed directly thereon and cannot be removed and replaced when desired.

Another object of the invention is the provision of a quick and inexpensive means for applying a pocket to the back of a pocket mirror and which may be accomplished by a person unskilled in the art.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved pocket mirror.

Figure 2 is a vertical sectional view therethrough.

Figure 3 is a collective perspective view of the several parts in a separated condition.

Figure 4 is a detail perspective view of a modified form of picture mounting.

Referring more particularly to the drawing, the reference numeral 10 designates a pocket mirror which in the present instance has been shown as round in configuration, but which may be oval, rectangular or of any other shape, if desired without departing from the spirit of my invention. The mirror comprises a back 11 constructed of celluloid or other similar yieldable material and in which the usual mirror glass 12 is mounted.

A picture or photograph 13 is trimmed to a size corresponding to the diameter of the mirror and has its back placed against the back 11 of the mirror. A transparent panel in the nature of a sheet of isinglass 14 fits against the front face of the picture 13 to protect the same, and the isinglass is held thereagainst by a ring member 15 which is substantially L-shape in cross section to provide a straight flange 16 to frictionally engage the peripheral edge of the mirror and a curved flange 17 at right angle thereto for engagement with the isinglass to retain the same against the picture. The flange 16 is formed with an inturned free edge engaging the face edge of the mirror. The ring fits tight over the peripheral edge of the mirror and by having the mirror back 11 constructed of celluloid, the same will slightly yield as the ring is slipped thereover to produce a tight fitting.

From the foregoing description, it will be appreciated that the mirror may be purchased without a picture mounted therein, and a person may remove the ring and insert his or her favorite picture. Should it be desired to replace the photograph or picture for a different one, the same may be easily accomplished by merely removing the ring from the mirror and substituting a new picture for the old one.

In some instances, the backs of the mirror are convexed or dome shape but this does not affect the picture mounting as the picture is flexible as well as the isinglass, and will flex to conform to the curvature of the mirror back. If desired, a curved glass crystal could be provided instead of the isinglass but in view of the fragile nature of the glass, I prefer to use isinglass.

In Figure 4 of the drawing, I have shown a slightly modified form of my invention for accommodating pictures of a size smaller in diameter than the diameter of the mirror. In such cases, I provide a mat 18 of a size to fit the back of the mirror and which mat is provided with a central window 19. The picture 13' is pasted to the back of the mat so that the image thereon registers with the window 19. The mat is then mounted on the back of the mirror similar to the picture 13 in the preferred form.

This method of applying photographs to mirror backs is less expensive than the process now employed, and has a marked advantage over the present method, as the picture may be changed when desired. Furthermore, the metal ring 15 imparts a neat and finished appearance to the mirror.

What is claimed as new is:—

In combination with a pocket mirror having a back, and a yieldable flange disposed at right angles to said back, a sheet of transparent material, said material and said back adapted to embrace a picture therebetween, the face of the picture being against the transparent material, a ring having a rigid flange releasably engaging said yieldable flange, and another flange integral with said rigid flange and disposed at right angles to the latter for gripping the outer marginal portion of the transparent material together with a picture.

In testimony whereof I have affixed my signature.

BERT CLARKE MELTON.